US012580871B2

(12) United States Patent
Murthy et al.

(10) Patent No.: US 12,580,871 B2
(45) Date of Patent: Mar. 17, 2026

(54) RESOURCE DEPLETION DETECTION AND NOTIFICATION IN AN ENTERPRISE FABRIC NETWORK

(71) Applicant: Cisco Technology, Inc., San Jose, CA (US)

(72) Inventors: Shree Narasimha Murthy, San Jose, CA (US); Sanjay Kumar Hooda, Pleasanton, CA (US); Sonal Prem Kumar Chhabria, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 18/241,079

(22) Filed: Aug. 31, 2023

(65) Prior Publication Data

US 2025/0080474 A1    Mar. 6, 2025

(51) Int. Cl.
H04L 47/80 (2022.01)
H04L 41/0604 (2022.01)
H04L 47/74 (2022.01)

(52) U.S. Cl.
CPC ........ H04L 47/745 (2013.01); H04L 41/0627 (2013.01); H04L 47/801 (2013.01)

(58) Field of Classification Search
None
See application file for complete search history.

(56) References Cited

U.S. PATENT DOCUMENTS 8,301,749 B1    10/2012  Finklestein et al.
2005/0102395 A1*  5/2005  Falcon ............... G06Q 10/0875
                                                709/227

| | | | |
|---|---|---|---|
| 2015/0188802 A1 | 7/2015 | Yoon et al. | |
| 2018/0227270 A1* | 8/2018 | Zhang | ................ G06Q 30/0201 |
| 2020/0137021 A1 | 4/2020 | Janakiraman | |
| 2020/0162337 A1 | 5/2020 | Jain et al. | |
| 2021/0152516 A1 | 5/2021 | Moreno et al. | |
| 2021/0185752 A1 | 6/2021 | Samuel et al. | |
| 2022/0045956 A1* | 2/2022 | Janardanan | ............. H04L 47/20 |
| 2022/0123997 A1* | 4/2022 | Bagade | .................. H04L 49/25 |
| 2022/0131898 A1 | 4/2022 | Hooda et al. | |
| 2023/0026450 A1 | 1/2023 | Gundavelli et al. | |
| 2023/0171662 A1 | 6/2023 | Moreno et al. | |
| 2025/0150459 A1* | 5/2025 | James | ................... H04W 12/08 |
| 2025/0193772 A1* | 6/2025 | Singh | ..................... H04L 47/10 |

OTHER PUBLICATIONS

Search Report and Written Opinion for International Application No. PCT/US2024/042551, Dated Jan. 23, 2025, 19 pages.
Invitation to Pay Additional Fees for International Application No. PCT/US2024/042551, Dated Nov. 26, 2024, 15 pages.

\* cited by examiner

*Primary Examiner* — Joshua Joo

(74) *Attorney, Agent, or Firm* — Lee & Hayes, P.C.

(57) ABSTRACT

Techniques that include a network that is configured in the first mode of a reactive mode to respond to a client attempting to access an endpoint of the network by providing information to be sent to a map server and by checking whether at least an IP address associated with the client corresponds to a registration produced for the client by a wireless controller. Further, the network is configured in a second mode of a proactive mode to determine based on a count maintained by a wireless controller of a number of client IP addresses whether to allow access or not to allow access to one or more clients to the network.

20 Claims, 9 Drawing Sheets

SD-Access Fabric Architecture

SD-Access Fabric Architecture

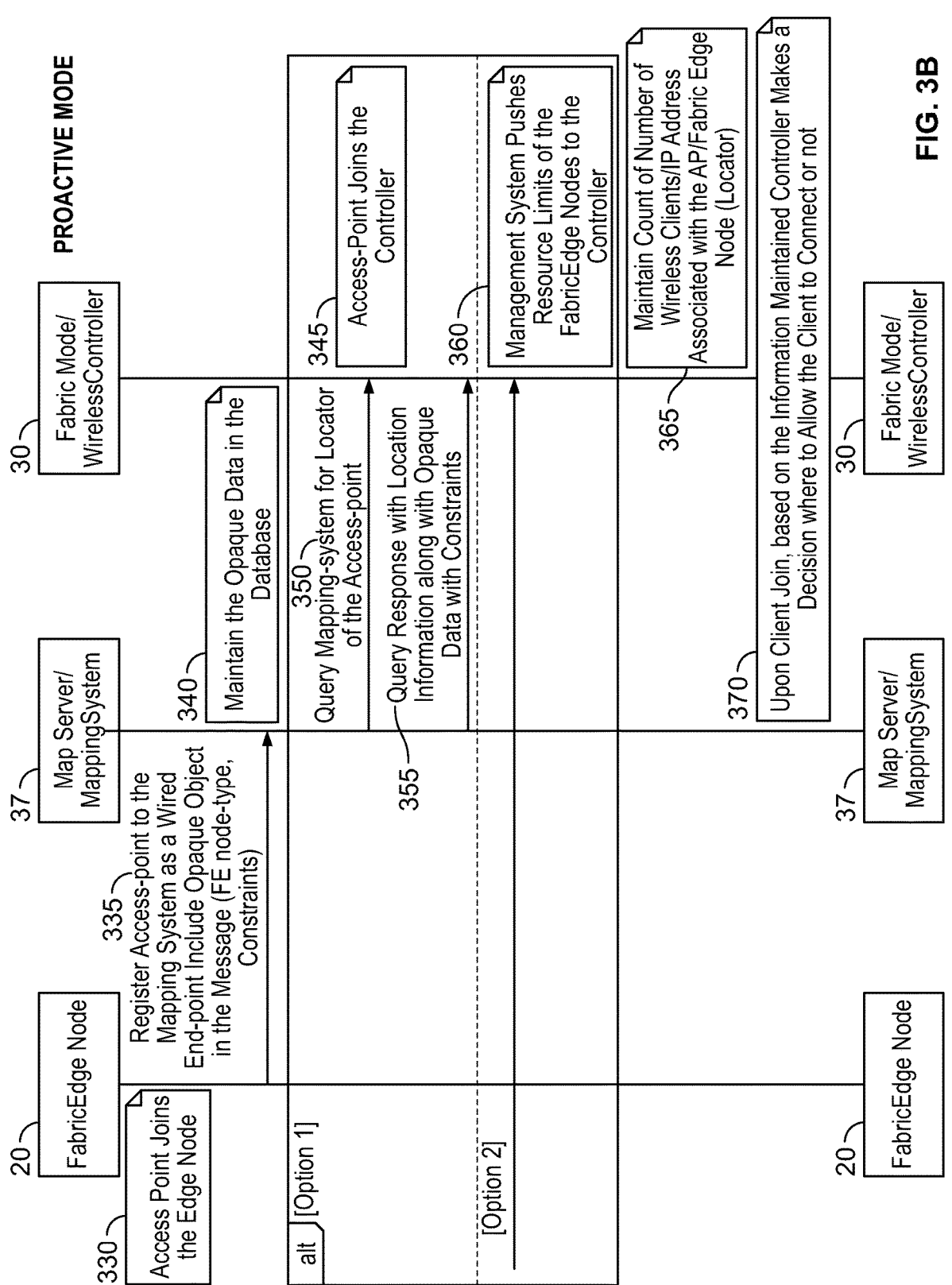

PROACTIVE MODE

30 — Fabric Mode/WirelessController

37 — Map Server/MappingSystem

20 — FabricEdge Node

330 — Access Point Joins the Edge Node

335 — Register Access-point to the Mapping System as a Wired End-point Include Opaque Object in the Message (FE node-type, Constraints)

340 — Maintain the Opaque Data in the Database alt [Option 1]

345 — Access-Point Joins the Controller

350 — Query Mapping-system for Locator of the Access-point

355 — Query Response with Location Information along with Opaque Data with Constraints

[Option 2]

360 — Management System Pushes Resource Limits of the FabricEdge Nodes to the Controller 365 — Maintain Count of Number of Wireless Clients/IP Address Associated with the AP/Fabric Edge Node (Locator)

370 — Upon Client Join, based on the Information Maintained Controller Makes a Decision where to Allow the Client to Connect or not 30 — Fabric Mode/WirelessController 37 — Map Server/MappingSystem 20 — FabricEdge Node

FIG. 3B

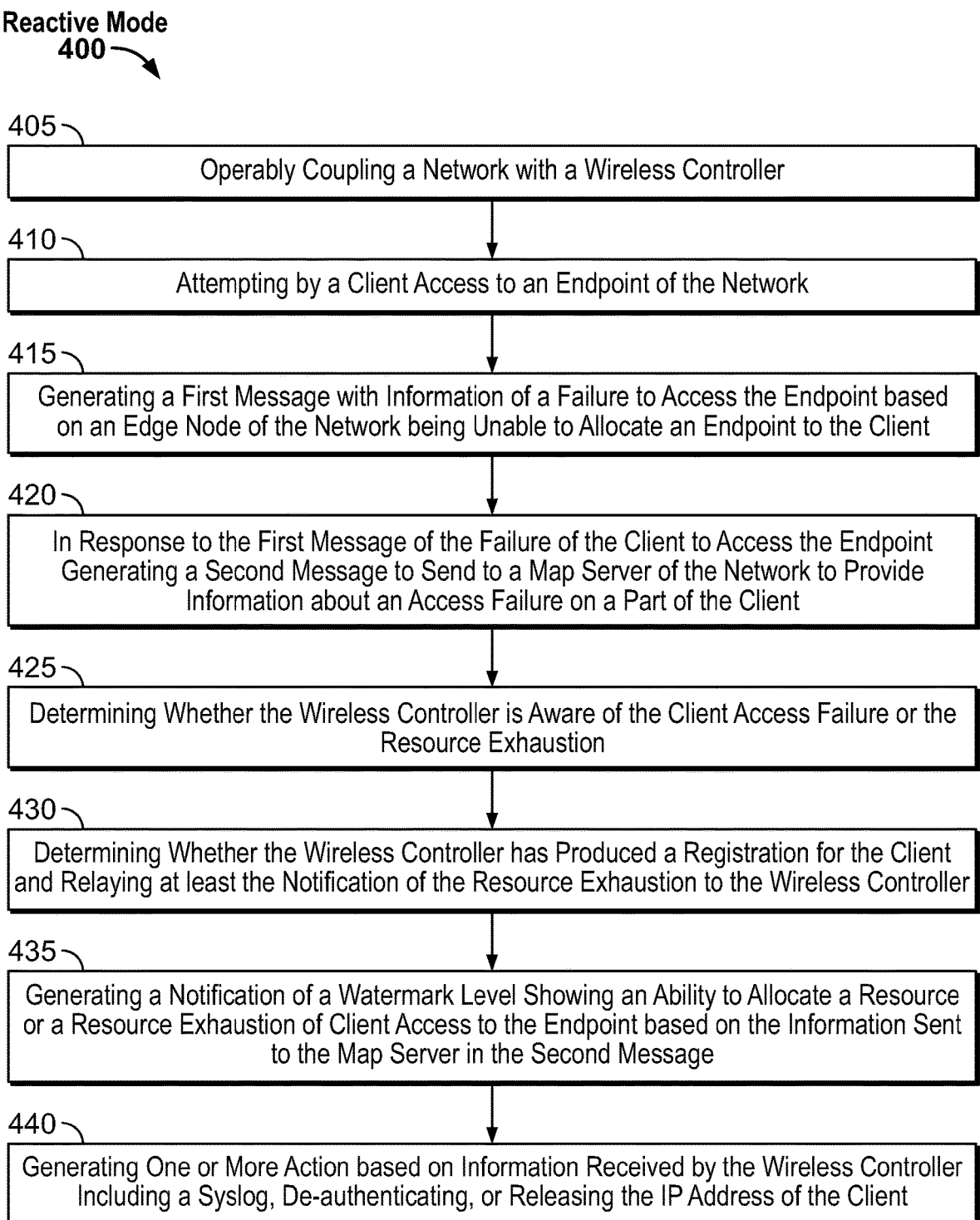

Reactive Mode
400

405 — Operably Coupling a Network with a Wireless Controller

410 — Attempting by a Client Access to an Endpoint of the Network

415 — Generating a First Message with Information of a Failure to Access the Endpoint based on an Edge Node of the Network being Unable to Allocate an Endpoint to the Client 420 — In Response to the First Message of the Failure of the Client to Access the Endpoint Generating a Second Message to Send to a Map Server of the Network to Provide Information about an Access Failure on a Part of the Client 425 — Determining Whether the Wireless Controller is Aware of the Client Access Failure or the Resource Exhaustion 430 — Determining Whether the Wireless Controller has Produced a Registration for the Client and Relaying at least the Notification of the Resource Exhaustion to the Wireless Controller 435 — Generating a Notification of a Watermark Level Showing an Ability to Allocate a Resource or a Resource Exhaustion of Client Access to the Endpoint based on the Information Sent to the Map Server in the Second Message 440 — Generating One or More Action based on Information Received by the Wireless Controller Including a Syslog, De-authenticating, or Releasing the IP Address of the Client

FIG. 4A

Proactive Mode
450

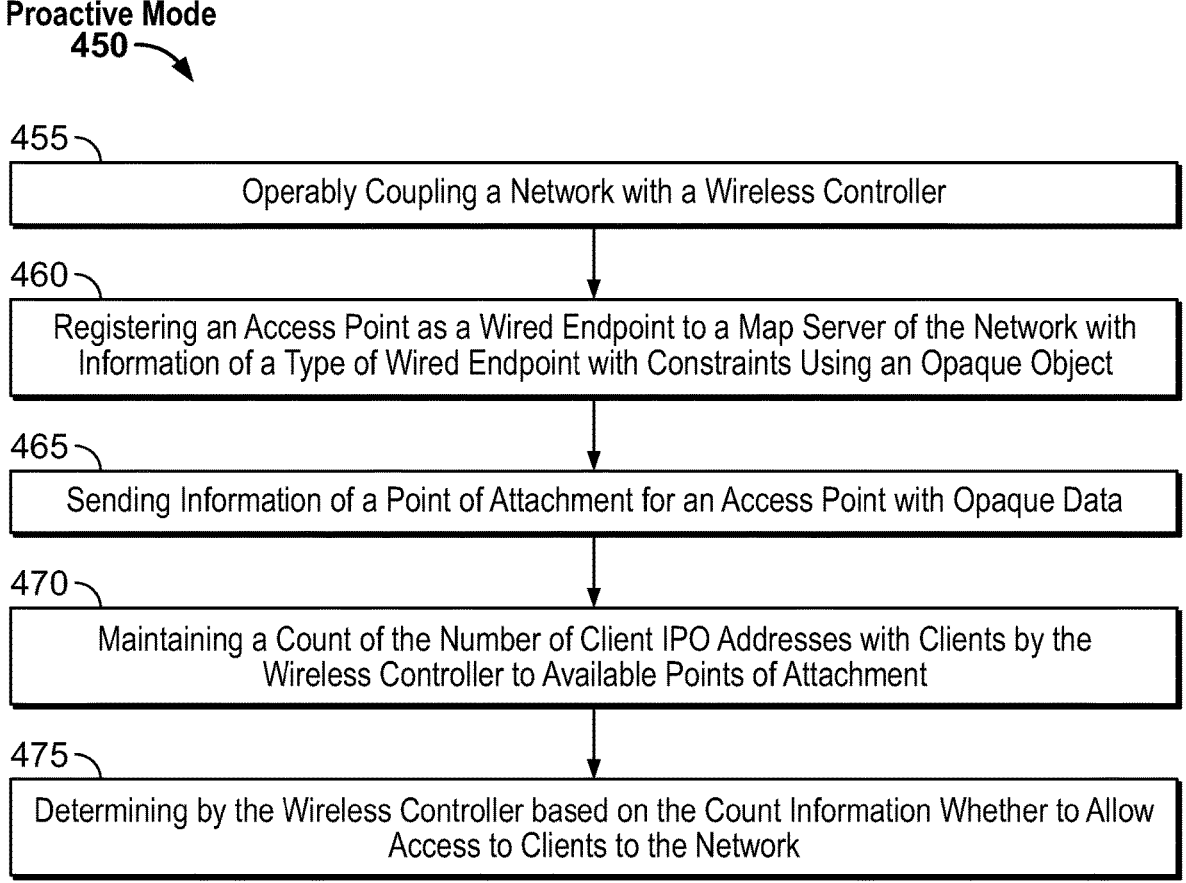

455

Operably Coupling a Network with a Wireless Controller

460

Registering an Access Point as a Wired Endpoint to a Map Server of the Network with Information of a Type of Wired Endpoint with Constraints Using an Opaque Object

465

Sending Information of a Point of Attachment for an Access Point with Opaque Data

470

Maintaining a Count of the Number of Client IPO Addresses with Clients by the Wireless Controller to Available Points of Attachment

475

Determining by the Wireless Controller based on the Count Information Whether to Allow Access to Clients to the Network

FIG. 4B

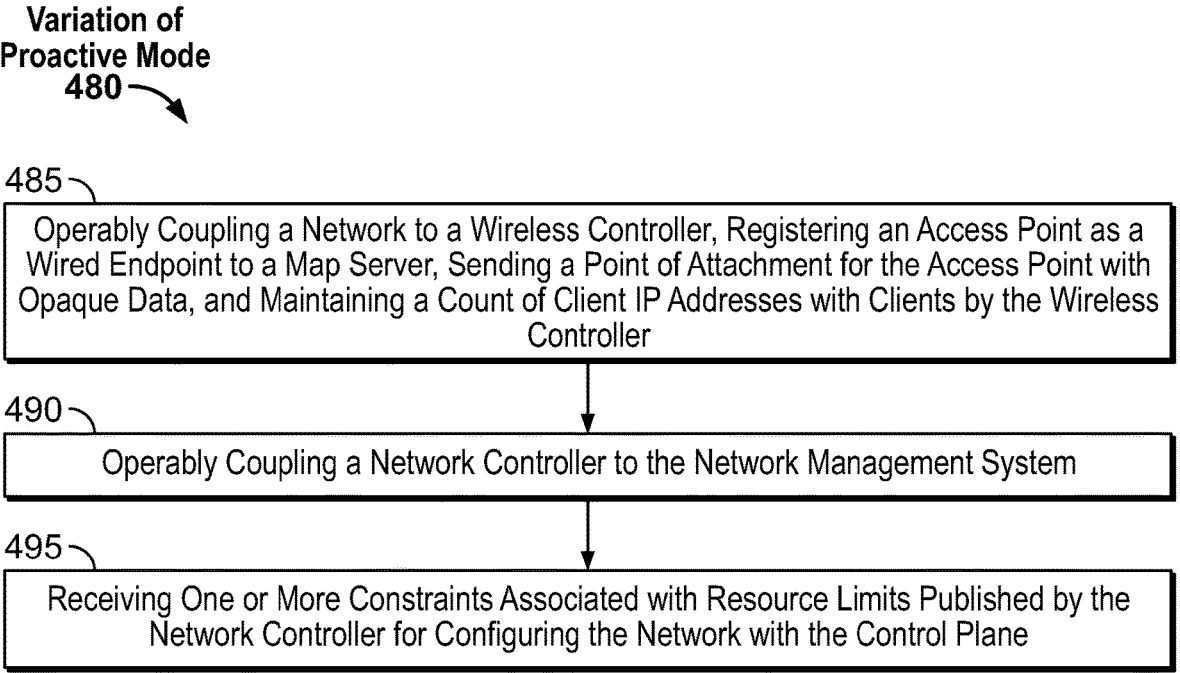

**Variation of
Proactive Mode
480**

485

Operably Coupling a Network to a Wireless Controller, Registering an Access Point as a Wired Endpoint to a Map Server, Sending a Point of Attachment for the Access Point with Opaque Data, and Maintaining a Count of Client IP Addresses with Clients by the Wireless Controller

490

Operably Coupling a Network Controller to the Network Management System

495

Receiving One or More Constraints Associated with Resource Limits Published by the Network Controller for Configuring the Network with the Control Plane

FIG. 4C

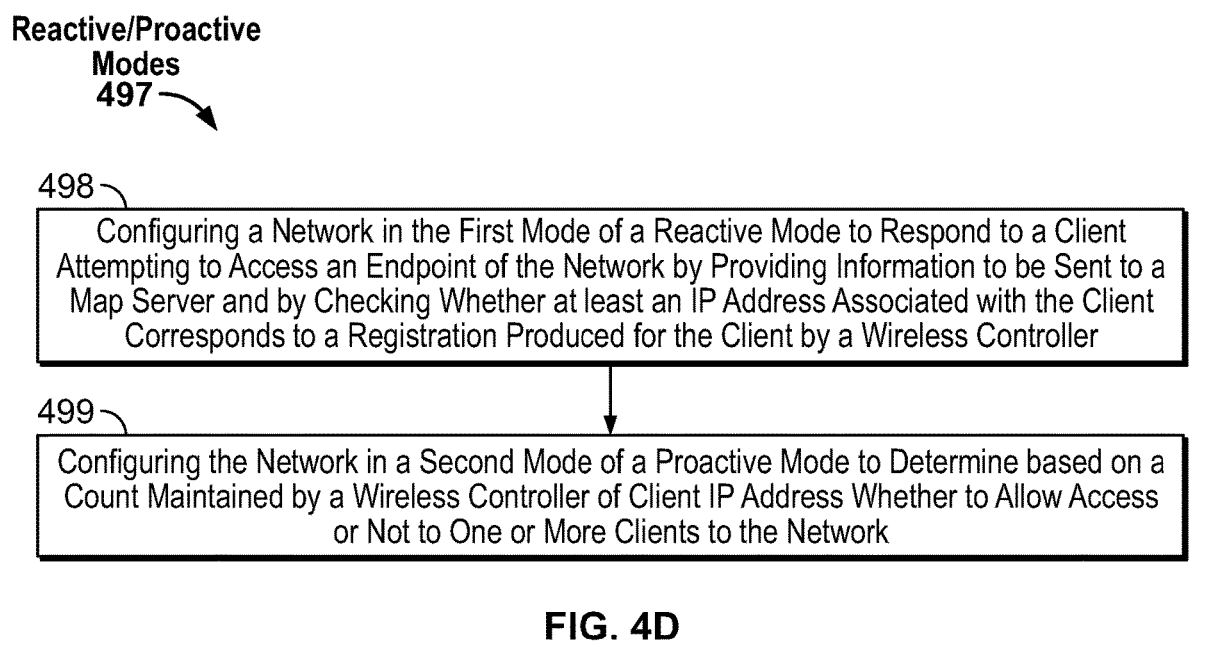

Reactive/Proactive
Modes
497 ⬎

498 ⬎

| Configuring a Network in the First Mode of a Reactive Mode to Respond to a Client Attempting to Access an Endpoint of the Network by Providing Information to be Sent to a Map Server and by Checking Whether at least an IP Address Associated with the Client Corresponds to a Registration Produced for the Client by a Wireless Controller |
|---|

499 ⬎

| Configuring the Network in a Second Mode of a Proactive Mode to Determine based on a Count Maintained by a Wireless Controller of Client IP Address Whether to Allow Access or Not to One or More Clients to the Network |
|---|

FIG. 4D

RESOURCE DEPLETION DETECTION AND NOTIFICATION IN AN ENTERPRISE FABRIC NETWORK

TECHNICAL FIELD

The present disclosure relates generally to the Fabric Network and the inability to allocate resources or resource depletion in a data path.

BACKGROUND

In an Enterprise Fabric Network, the hardware resources that are available or made available on the network elements can or may be limited. One example of this constraint is the availability of end-point identifiers supported on the Fabric edge node. The number of endpoint identifiers that can be supported in a network element in the fabric data path depends on the resources available in the network element/ Fabric Edge Node. This is because each end-point identifier is configured to correspond to an IP address (i.e., an IPv4 or IPv6). When IPv6 clients are supported, each IPv6 client can have more than one (up to 8) Ipv6 addresses. The number of IPv6 addresses used corresponds to the number of EID entries, in this case, 8 EID entries. When wireless clients are supported, since the wireless control plane is separated from the data plane, there may be or is no visibility in the wireless control plane to detect the depletion of the EID space (or any such resource) in the fabric data path. This will result in the client being in a RUN state on the wireless controller while in reality, the client will not be able to communicate. This becomes a difficult issue to troubleshoot. Also, this can result in clients being dropped without notice.

In an integrated wireless SDA network, one of the advantages is the separation of the wireless control and data plane to leverage the speeds and feeds of the wired data path for wireless traffic forwarding. There is no direct communication between the wireless controller and the fabric edge nodes (access switches) to which the access points are directly or indirectly connected. The exchange of information from WLC to the network fabric infrastructure happens only through the mapping database (through registering the wireless endpoints with the mapping database). Also, currently, there is no feedback mechanism to the wireless control plane if there is any resource constraint or depletion that can potentially happen on the fabric data plane.

It is desirable to implement provides a communication path to exchange information from the fabric wireless controller (WLC) to the network fabric infrastructure using the registration process of the mapping database by registering the wireless endpoints with the mapping database. This enables a bridge that indirectly enables the communication/ visibility of the depletion of resource space between the wireless controller and the resources of the fabric edge nodes as currently as explained there is no direct communication or visibility of resource availability between the wireless controller and the fabric edge nodes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A, and 3B illustrate diagrams of an example flow between the fabric edge border node, the map server/ mapping system, and the wireless controller of the network according to some embodiments.

FIGS. 4A, 4B, 4C, and 4D illustrate flow diagrams of example flows associated with the reactive mode, proactive mode, and variations of the modes for the network management system according to some embodiments.

DESCRIPTION OF EXAMPLE EMBODIMENTS

Overview

Figure 1:
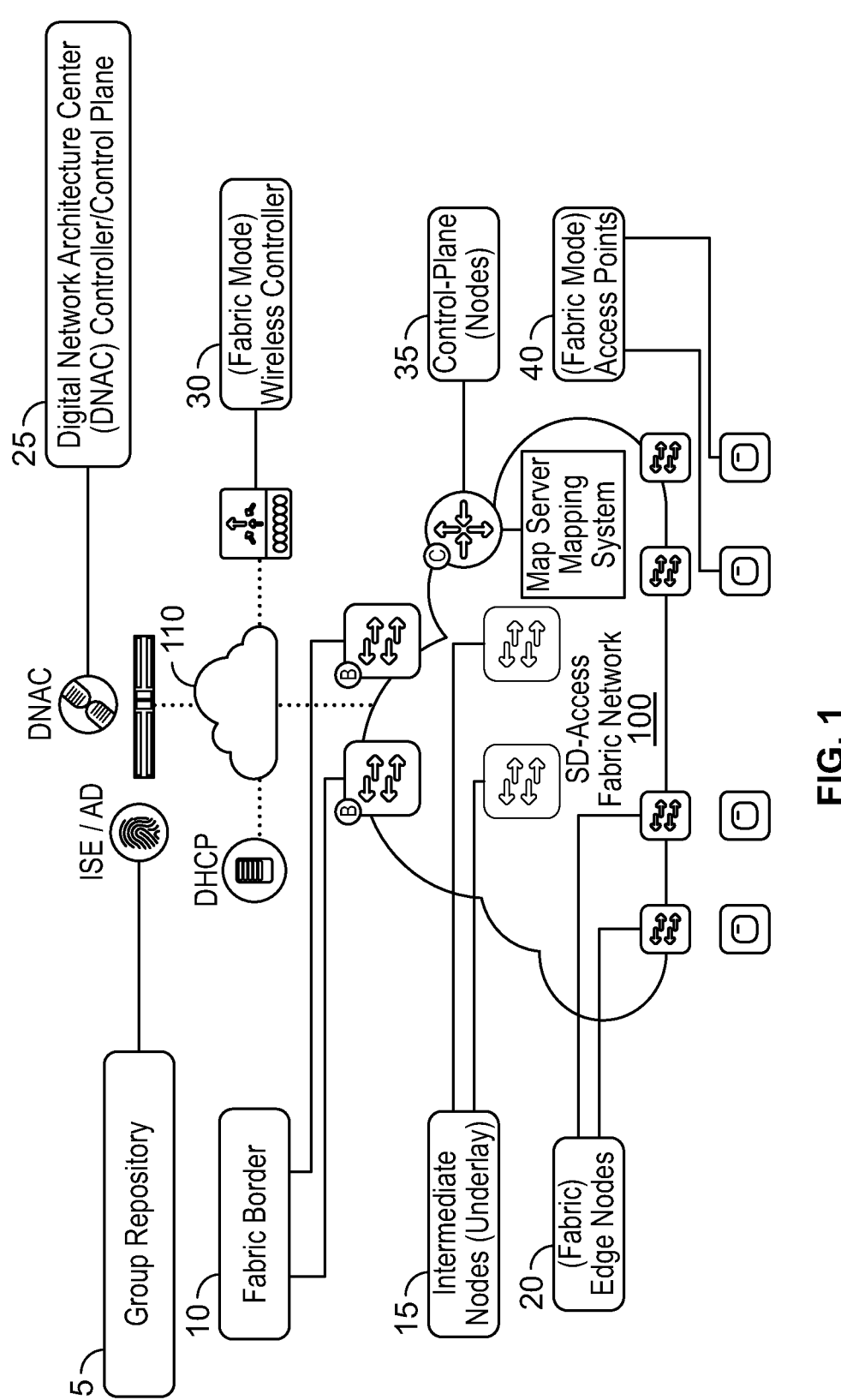
FIG. 1 illustrates a Software Defined (SD)-Access fabric architecture diagram of an example network containing a wireless control and data plane that is enabled to exchange information from the wireless controller (WLC) to the network fabric for at least client onboarding.

This disclosure describes techniques for monitoring resource availability, depletion, and exhaustion in an enterprise fabric network. The Enterprise Software Defined Network (SDN) provides a management component to determine and provide visibility of the resource deletion and exhaustion of endpoints in a fabric network by a remotely connected wireless controller or control plane for onboarding a client.

The systems and methods described herein provide processes directed toward providing a feedback mechanism for a reactive approach, a proactive approach, and a variant of the proactive approach for onboarding clients in an integrated wireless Software Defined Access (SDA) network where there is a separation of the wireless control and the data plane. For example, with no direct communication between the wireless controller and fabric edge nodes (across switches) to which the access points are directly or indirectly connected, systems and methods disclosed provide knowledge of resource constraint or depletion or the prediction of resource depletion in the data path that may potentially occur on the fabric data plane and send this information to the wireless controller to prevent unknown client behavior from occurring.

In some embodiments, the systems and methods provide for a reactive approach to resource depletion and include when the fabric edge node fails to allocate an endpoint identifier (EID) to the client IP due to (hardware) resource constraints or exhaustion, the network management system is configured with a mapping system (i.e., the map server) using a new or first message type that assists in the notification to the wireless controller. In some embodiments, the notification feedback mechanism used can be varied to be configured with high and low watermarks that are indicative of resource allocation and trigger notifications based on the respective watermark level being reached. The new or first message that is generated and sent to the map server may include information about the client IP and/or MAC address for which the entry in the data path was not created or the creation failed. The map server may be configured to check the client's MAC address to determine if the wireless controller was one of the producers of the (particular) MAC registration (i.e. if that MAC address had been registered by the wireless controller). If the map server or the other components of the network management system determine that this is a wireless client, then the resource exhaustion message is relayed to the controller as a new or second message from the map server to the wireless controller. In response, the wireless controller may be configured to take appropriate action that may include generating a Syslog message, de-authenticating the client, and/or releasing the IP address, etc.

In some embodiments, the systems and methods provide for the proactive approach to resource depletion and include providing constraints or resource limitations that are dependent on the platform type enabled by the wireless and the data plane. In some embodiments, when a fabric edge node or another network component of the network management system registers an access point as a wired client to the map server, the registering component may also indicate its type and the potential constraints on the map server that may occur using an opaque object. When the wireless controller queries or makes a request to the map server or the network management system for the locator of the access point, in addition to requesting the point of attachment of the access point, the registering component will also receive the associated opaque data. In some embodiments, the wireless controller is configured to maintain a count of how many or the number of clients and IP addresses (and/or MAC addresses) are associated with the client, and to which point of attachment is the client attached in the network. Based on the number of IP addresses associated with the client, the wireless controller may decide or determine whether to allow the client to be or not to be connected to the network (i.e., allow the client to attempt network access).

In some embodiments, the systems and methods provide for a variant of the proactive approach of resource depletion and include the operation described of the proactive approach, and in addition, enable the Digital Network Architecture Center (DNAC) to push or publish automatically resource limits for each fabric edge node to the wireless controller for the constraint of resources and client access.

Additionally, the techniques described herein may be performed by a system and/or device having non-transitory computer-readable media storing computer-executable instructions that, when executed by one or more processors, performs the method described above.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The following examples describe a fabric network (or SD access fabric network). However, this is an example, and embodiments of the disclosure are not limited to fabric networks and may be used in conjunction with fabric or non-fabric networks for example.

The (SD access) fabric network may include a network topology in which components pass data to each other through interconnecting network nodes (e.g., devices). SD-access Fabric networks may include an overlay and an underlay. The underlay deals with connectivity between fabric network devices and the overlay deals with user traffic transiting the fabric network. The fabric network overlay components can include fabric Edge Devices (EDs), fabric intermediate devices, fabric Border Devices (BDs), a Map Server (MS), and a fabric Control Plane (CP). In the fabric network overlay, edge devices may be enabled with data packet protocols such as a Locator/ID Separation Protocol (LISP); nodes configured with an xTR (Ingress/Egress Tunnel Router) or can be PxTR (Proxy xTR) nodes, border devices that may include for example, LISP PxTR (Proxy xTR) nodes, and endpoints (e.g., client devices, mobile clients, or hosts) that may be attached to the edge devices of a fabric. The endpoints may be identified by an Endpoint Identifier (EID). Each device in the fabric network may be configured with an address (e.g., a locator address). Edges devices may register discovered EIDs (from the endpoints) with a fabric host-tracking database at a local map server associating the discovered EID to, for example, the locator address of a subnet.

In some embodiments, functional components of the fabric network overlay may include fabric Edge Devices (EDs or FEs), fabric intermediate devices, fabric Border Devices (FBs or BDs), a Map Server (MS), and a fabric Control Plane (CP). In some embodiments, the fabric of the fabric network may be defined as the physical wirings that make up these connections or it may refer to a virtualized, automated lattice of overlay connections on top of the physical topology. The fabric networks are divided into an overlay and an underlay architecture in which the underlay architecture provides for interconnectivity between network devices in one or more fabric networks while the overlay architecture provides for routing of data traffic that is transmitted throughout the fabric network.

The fabric overlay may provide stretched Layer-2 service using a Layer-3 overlay, which may provide the flexibility of extending a subnet to any part of the fabric network. For example, a subnet may be present across multiple fabric edge devices with the same anycast gateway Internet Protocol (IP) address to allow for roaming by allowing endpoints to continue using the same gateway IP address. The provided services may also include Layer-3 overlay service and built-in mobility.

In some embodiments, in the fabric network overlay. FE devices may comprise, for example, Locator/ID Separation Protocol (LISP) XTR (Ingress/Egress Tunnel Router)/PxTR (Proxy xTR) nodes, and FB devices may comprise, for example, LISP PxTR (Proxy xTR) nodes. Endpoints (e.g., client devices or hosts) may be attached to the FE devices. The endpoints may be in the Endpoint Identification space where each endpoint may have an Endpoint Identifier (EID). Each device in the fabric network (e.g., FE devices and FB devices) may be configured with an address (e.g., a locator address). FE devices may register discovered EIDs (from the endpoints) with a fabric host-tracking database running on the MS associating the discovered EID to, for example, the configured locator address of the FE device that discovered it.

Although the systems and methods described herein are discussed with respect to one or more component hosts, these systems and methods may be used with any type of device or system. Further, although particular examples are discussed with reference to component machines, alternate embodiments may include other types of devices including virtual devices that are bridged or located on a centralized connected (internal or external) platform.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network of a Software-Defined Access (SDA) architecture of the SD-Access Fabric. The SD-Access Fabric network 100 creates a virtual overlay over an underlying physical network infrastructure using software-defined access (SDA) that decouples the hardware from the network functions. SD-Access networks may involve different types of nodes (e.g., edge switches, border routers, access points (APs), wireless controllers (WLCs), control plane server devices, etc.) as well as different types of connectivity (e.g., underlay links, overlay tunnels, etc.). The SD-Access fabric (management cloud 110) may employ software-defined access (SDA) and may represent a programmable network that provides software-based policy and segmentation from an edge of the enterprise fabric to applications/devices/ nodes/etc. external to the enterprise fabric that utilizes the enterprise fabric for end-to-end connectivity. As referred to herein, the terms 'enterprise fabric', 'enterprise IP fabric', 'enterprise network fabric,' 'SDA/enterprise fabric', and variations thereof may be used interchangeably to refer to an enterprise fabric, such as enterprise fabric network 100, which may employ SDA to facilitate end-to-end network connectivity for multiple accesses via the enterprise fabric.

The SD-Access network 100 uses a locator ID separation protocol (LISP) as the underlying protocol for mobility support with a wireless controller 30 that provides a network abstraction layer to arbitrate the specifics of various network elements. The digital network architecture center (DNAC) 25 (e.g., a software-defined network (SDN) controller) exposes northbound representational state transfer (REST) based application programming interface (APIs) to facilitate third-party or in-house development of meaningful services on the network. For example, the SDN controller 35 provides graphical user interface management abstraction via multiple service apps which share information. The group repository 5 enables external ID services to be leveraged for dynamic user or device to group mapping and policy definition. The fabric border 10 includes border devices that provide access to the management cloud 110.

The edge nodes 20 are fabric device (e.g., access or distribution) that connect wired endpoints to the SDA fabric. The fabric mode Access Points (APs) 40 are access points that are fabric enabled, and the wireless traffic is VXLAN encapsulated.

In some embodiments, when a client is attempting to access an endpoint of the network 100 and is unable to access the endpoint because the fabric edge node 20 (i.e., a network management system) is unable to allocate an endpoint for the client for the network access, a first message indicative of the failure to access may be generated at the edge node 20 about the access failure. In some embodiments, a new message or a second message may be generated by the edge node 20 based on the first message to send to the map server 37 (i.e., the local mapping system) that may include other information including a message or notification of a resource exhaustion or a depletion of available resources at the network 100 for client access.

In some embodiments, the fabric border 10 device provides information about not being able to allocate an endpoint identifier (EID) to the client of the network. In some embodiments, the network 100 including intermediate nodes 15, the control plane nodes 35 and the fabric border 10 devices determine whether the client is aware of the resource exhaustion or resource depletion based on the information that is provided to the wireless controller 30 by checking whether the IP address of the client or the MAC address of the client corresponds or is associated with a registration or MAC registration of the client at the wireless controller 30.

In some embodiments, if it is determined that the wireless controller 30 has registered a client address, then the control plane 35 node or the fabric border 10 device may relay a message or notification of the resource exhaustion to the wireless controller 30. In some embodiments, the notification may include a watermark level that represents the ability or the inability of the network to allocate a resource (i.e., an endpoint) or resource exhaustion for the client access to the network 100. This message may be based on the information that is sent or registered with the map server 37 (i.e., mapping system) of network 100. For instance, the watermark level that is presented may be a high watermark level or a low watermark level and may be presented with a graphical user interface (GUI) management abstraction of the SND controller 25. The above-noted example is merely illustrative, and various changes may be made to achieve similar or the same results.

Figure 2:
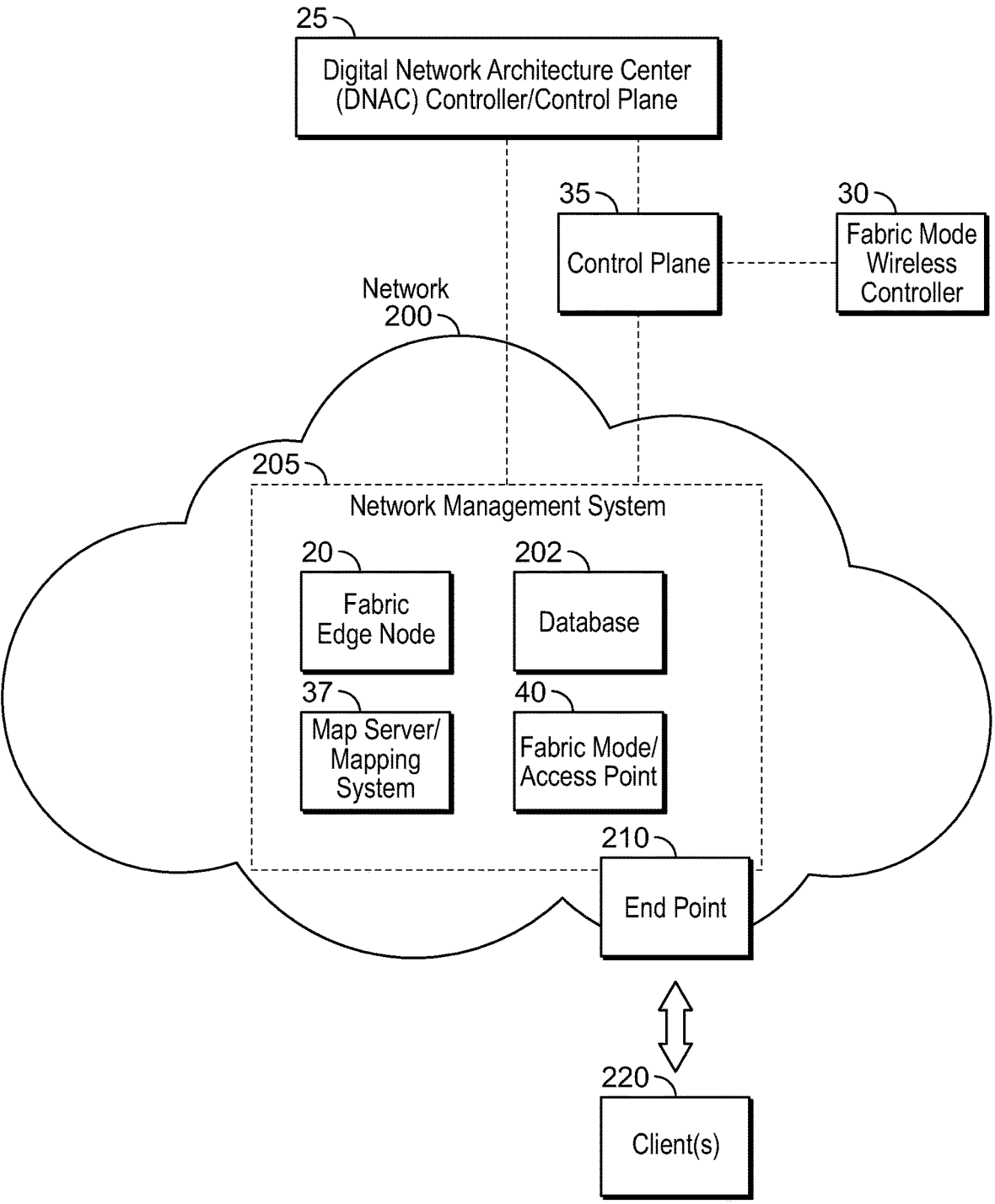
FIG. 2 illustrates a diagram of an example network containing a network management system that is configured to communicate with the wireless control and data plane and to exchange information about resource exhaustion and/or depletion of resources for client access during client onboarding.

FIG. 2 illustrates a network-configured architecture for reactive and proactive network responses for client access to the network and includes a wireless controller and control plane for enabling allocating of endpoints for client access or not and providing notice of resource depletion and/or resource exhaustion of the network to at least the wireless controller in accordance with various embodiments. FIG. 2 is similar to FIG. 1 but includes additional details of the architecture of client access to the endpoint with the control plane and the wireless controller that supports the message notification process for notification of resource exhaustion or depletion to a wireless controller and client.

In some embodiments, the (egress) border device 10 (of FIG. 1) uploads mappings of IP address and MAC address of clients to a control plane 35 for relaying to a wireless controller 30 that has information of clients registered at endpoints of the network 200 or seeking to access and to register with the network 200.

The network 200 operates in multiple modes that include a first mode of a reactive mode and a second mode of a proactive mode and a third mode which is a variation of the proactive mode.

Option 1: Reactive Mode

In the reactive mode, when the (fabric) edge node 20 fails to allocate an EID to the client IP in the hardware that may be due to hardware resource exhaustion (or for other reasons such as prioritizing network 200 subscriber access etc . . . ), the fabric edge node 20 may indicate this information such as the denial of access or allocation of an endpoint using a different or new message type to the map server 37. In some embodiments, a variation of this mechanism is implemented to keep a high and/or low watermark for resource allocation and to trigger the notification based on the watermark level reached.

The new message may also contain information about the IP and Mac of client 220 for which the entry in the data path (i.e., the endpoint 210) was not created and/or the creation of the entry failed. In some embodiments, the map server 37 may, or will determine if the resource exhaustion notification is being received for a wireless client 220. For example, in an implementation, in the map server 37, the client 220 client Mac address is checked (by components of the network management system 205) to see if the wireless controller 30 was one of the producers of the Mac registration (that is if that Mac was registered by the wireless controller 30). If the map server 37 (or other components of the network management system 205) determines the MAC address is associated or is a wireless client 220 (i.e., the wireless client 220 that has been registered by the wireless controller 30), then the new message of resource exhaustion is relayed from the map server 37 via the control plane 35 to the wireless controller 30 (e.g., a new or special relay message from the map server 37 is sent to wireless controller (WLC) 30). In response, the wireless controller 30 can take one or more appropriate actions with respect to the particular wireless client 220 that has been identified. For example, the wireless controller 30 may take an appropriate action on that client that includes an action to generate a Syslog message (i.e., device logging information), an action to de-authenticate the client, and/or an action to release the identified IP address, etc.

Option 2: Proactive Mode

In the proactive mode, the resource limitation of the fabric edge node is dependent on the platform type. When the fabric edge node 20 registers an access point 40 as a wired client to the map server 37, it also indicates its type and potential constraints to the map server 37 as an opaque object. When the wireless controller 30 queries the map server for the locator of the access point, in addition to the point of attachment of the access point, it will also get the associated opaque data. The wireless controller 30 is also configured to maintain a count of how many clients' IP addresses are associated with the client 220, and to which point it has an attachment to the network 200. In some embodiments, the count and other data are stored by the network management system 205 and are configured and maintained as opaque data in database 202. Based on the number of IP addresses associated with client 220, the wireless controller 30 determines (i.e., unilaterally decides) whether to allow client 220 to be connected or not Option 3: Variation of the Proactive Approach The network control plane (e.g., Digital Network Architecture Center (DNAC) control plane of a centralized intent-based network management system) will push the resource limits per Fabric Edge to the wireless controller 30. The other steps are the same as described above with respect to Option 2: the proactive approach (i.e., the rest is the same as Option 2).

Figure 3A:
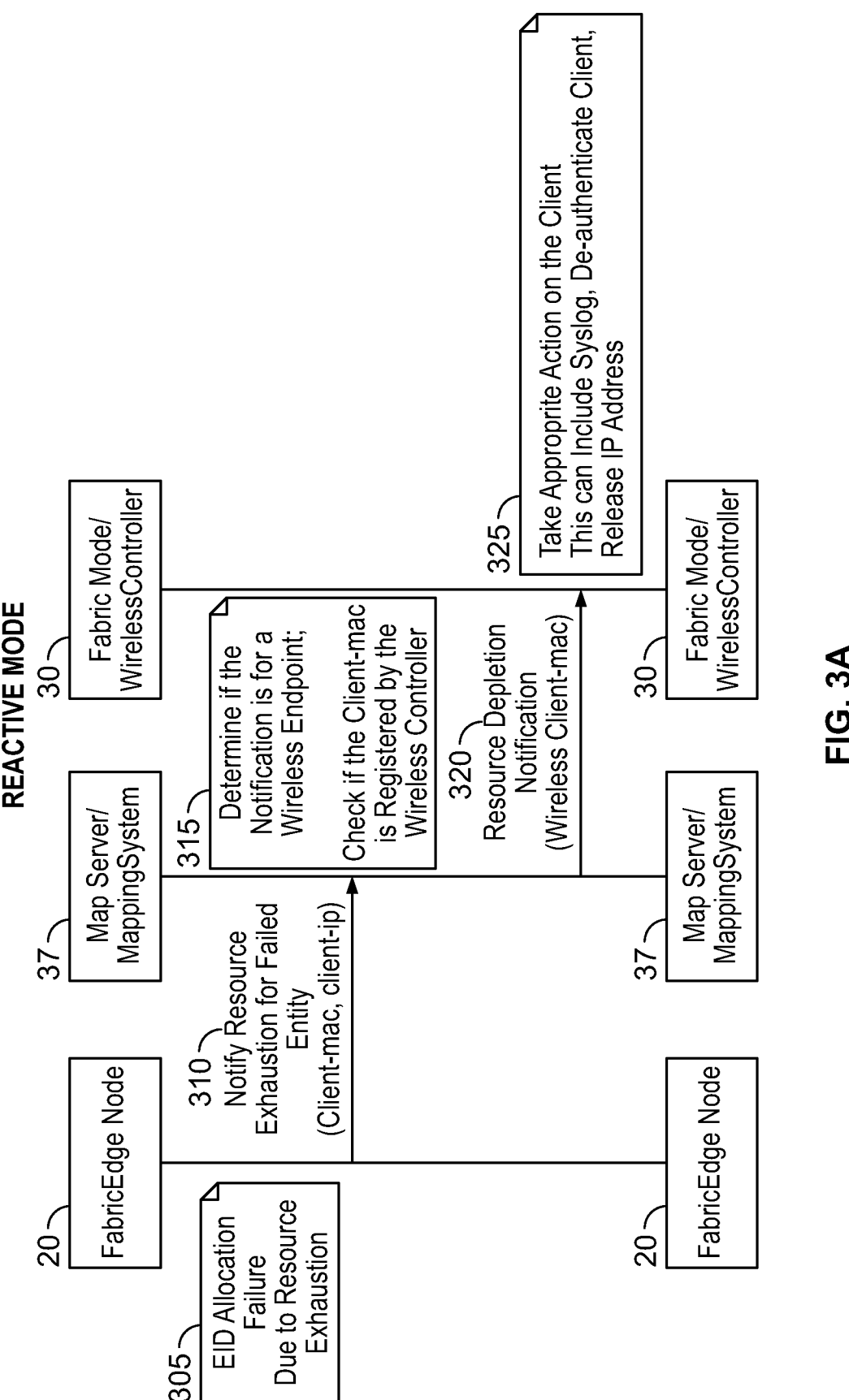

FIGS. 3A, and 3B are diagrams illustrating an example flow between the fabric edge border node, the map server/mapping system, and the wireless controller of the network according to some embodiments.

(A) Reactive Approach:

In FIG. 3A, at 305, the fabric edge node 20 is unable to allocate a resource to a client attempting access to an endpoint of the network. In some embodiments, at 305, the inability to allocate a resource may be due to an endpoint (EID) device failure due to resource exhaustion. At 310, a message is generated from the fabric edge node 20 to provide a notification about the resource exhaustion for the failed entity (i.e., allocation of the client MAC address, client IP address) to send to the map server 37 (i.e., the mapping system of the network) for associating with the access failure with the access request of the client device and for reporting the access failure to a control plane 35 or other device outside of the fabric or wirelessly connected to the fabric network 200.

At 315, the map server 37 or other components of the network management system 205) determine whether the notification based on the message from the fabric edge node 20 is associated with a wireless endpoint (i.e., a client 220 attempting access and a failure to grant access to the fabric site). Next, the network management system 205 may check if the MAC address of the client is or has been registered by the (fabric mode) wireless controller 30. The network management system 205 may generate from the map server 37 a new message or a second message to send at 320 to the particular wireless controller 30 that has registered the wireless client 220. The new or second message may include a notification of resource depletion and contain the IP address and/or MAC address associated with client 220. At 325, the wireless controller 30 may take one of a number of actions deemed appropriate that include generating a syslog, de-authenticating client 220, and/or releasing the IP address of client 220.

(B) Proactive Approach

With reference to FIG. 3B, at step 330, an access point 40 is configured at the fabric edge node 20 or is joined to the fabric edge node 20. The fabric edge node 20, at 335, registers the access point to the mapping system (i.e., to the map server 37). At 340, the map server 37 or the network management system 205 is configured to maintain opaque data in database 202. At 345, access point 40 is joined to the fabric mode wireless controller 30. At 350, the fabric mode wireless controller 30 performs a query operation and sends a request of a query to the map server 37 and/or to other elements of the network management system 205. In response to receiving the request from the fabric mode wireless controller 30, at 355, a query response is formulated with location information along with opaque data with constraints. At 360, the network management system 205 may publish via a publication mechanism in response to the querying event or periodically or may be configured to respond to other events, information about resource limits of the fabric edge node(s) 20 to the fabric mode wireless controller 30. At 365, at the fabric mode wireless controller 30, a count is maintained that may correspond or be associated with a count maintained at the map server 37 that is of or associated with a determined number of wireless client(s) 220, and IP addresses/MAC addresses associated the access point(s) 40 of the fabric edge node locator (e.g., endpoint locator (EID)). At 370, at the fabric mode wireless controller 30, in response to or upon the client(s), 220 joining the fabric mode wireless controller 30, and based on information maintained by the fabric mode wireless controller 30, the fabric mode wireless controller may decide or determine to make a decision on whether to allow or enable the client(s) 220 to connect or not to the network.

In some embodiments, the described system and methods may be divided into a flow sequence that consists of (1) reactive, (2) proactive, and (3) variant of the proactive operations of the network ability to allocate or not allocate SD-access to clients and the client's wireless controller being made of the access failure by clients or the network exhaustion of resources for client access.

FIGS. 4A, 4B, 4C, and 4D illustrate flow diagrams of example flows associated with the reactive mode, proactive mode, and variations of the modes for the network management system according to some embodiments.

Referring to FIG. 4A, the exemplary flowchart 400 illustrates a reactive mode of operation of the network. In some embodiments, at step 405, various components are operably coupled and include a network 100 to a control plane 35 that communicates with a wireless controller 30. At step 410, client 220 may attempt access to a network. In some embodiments, in response to client, 220 attempts to access network 100 (i.e., an endpoint of the network), at step 415, in the case of an access failure on the part of client 220 to access network 100, a message (i.e., a first message) may be generated by components of a network management system 205. For example, the first message may include information on the failure to access the endpoint based on an edge node 20 being unable to allocate an endpoint for the client 220. At step 420, in response to the generation of the first message, and the first message information about the access failure because of the inability to allocate the endpoint to client 220, the network management system 205 may generate a new or second message to send to the map server 37 about the access failure or resource exhaustion that occurred or may occur. The new or second message may include information on resource exhaustion to allocate the EID of the endpoint to the client by the network. At step 425, determining, by the network management system, whether the client is aware via the control plane of at least of the resource exhaustion provided by the information sent to the map server by the network management system by checking whether at least an IP address associated with the client corresponds to a registration produced for the client by the wireless controller. At step 430, the network management system 205 determines whether the wireless controller has produced a registration of the client 220 and relays a notification if a registration has been produced to the wireless controller 30. In an embodiment, the network management system 205 is configured in a reactive mode to respond to the failure of the client 220 to access an endpoint of the network 100.

At step 435, the network management system 205 is configured to generate a notification using a watermark level of either the ability to allocate a resource to the client 220 or an inability to allocate a resource (i.e., a resource exhaustion state to an endpoint for client 220 access of the network) to the client 220 when the client is attempting access to the network 100. In some embodiments, the watermark level which is configured may include a high watermark level or a low watermark level. The registration of the client 220 at the map server 37 may include a MAC registration and/or IP address registration. Likewise, the registration at the wireless controller 30 may include at least a MAC address registration associated with the client 220 or an IP address registration associated with the client 220 or both. At step 440, based on the information sent to the map server 37 by the network management system 205 and received by the wireless controller 30, the wireless controller 30 may be configured to generate a syslog message associated with the failure of the client 220 to access the network, de-authenticate the client 220 from the network, and/or release the IP address or MAC address associated with the client 220.

Referring to FIG. 4B, the exemplary flowchart 450 illustrates a proactive mode of operation of the network. At step 455, various components are operably coupled and include a network 100 to a control plane 35 that communicates with a wireless controller 30. At step 460, an access point 40 is registered by an edge node 20 or other components of network management system 205 as a wired endpoint to a map server 37 of the network 100 with information of a type of wired endpoint with constraints using an opaque object. In some embodiments, the constraints that are implemented are dependent on the platform type which is used to register the access points 40. At step 465, the network management system 205 is configured to send information in response to a request or inquiry by the wireless controller 30 of a point of attachment for an access point 40 with opaque data. In some embodiments, a type of constraint and a potential constraint is sent and indicated to the map server 37 in an opaque object. At step 470, the wireless controller 30 may be configured to maintain a count of the number of client IP addresses or MAC addresses with clients to available points of attachment of the network 100. At step 475, the wireless controller 30 is configured to determine based on the count information whether to allow access of clients 220 to the network 100.

Referring to FIG. 4C, the exemplary flowchart 480 illustrates a variation of the proactive mode of operation of the network. In FIG. 4C, the variant approach of the proactive mode of operation follows a similar or same set of operations at step 485 of operably coupling a network to a wireless controller, registering an access point as a wired endpoint to a map server, sending a point of attachment for the access point with opaque data, and maintaining a count of client IP addresses with clients by the wireless controller. At step 490, the variant proactive mode of operation, operably couples a network controller (i.e., the DNAC controller 25) to components of the network management system 205. At step 495, the network management system 205 applies a set of constraints that are published or received from the network controller (i.e., the DNAC controller 25) to configure components of the network 100 and the control plane (nodes) 35 of the network 100.

Referring to FIG. 4D, the exemplary flowchart 497 illustrates both modes of the reactive and proactive modes of operation of the network. In FIG. 4D at step 498, the network 100 is configured for operation in the first mode of a reactive mode to respond to a client 220 attempting to access an endpoint of the network 100 by providing information to be sent to a map server 37 and by checking whether an IP address or MAC address associated with the client 220 corresponds to a registration produced for the client 220 by a wireless controller 30. At step 499, the network 100 is configured for operation in a different mode of the proactive mode to determine based on a count maintained by a wireless controller 30 of client IP addresses or MAC addresses whether to allow access or not to allow access to clients 220 to the network 100.

The logical operations described herein with respect to FIGS. 1-2, 3A, 3B, 4A, 4B, 4C, and 4D may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in the FIGS. 1-2, 3A, 3B, 4A, 4B, 4C and 4D which are described herein. These operations can also be performed in parallel, or in a different order than those described herein. Some or all of these operations can also be performed by components other than those specifically identified. Although the techniques described in this disclosure is with reference to specific components, in other examples, the techniques may be implemented by fewer components, more components, different components, or any configuration of components.

Figure 5:
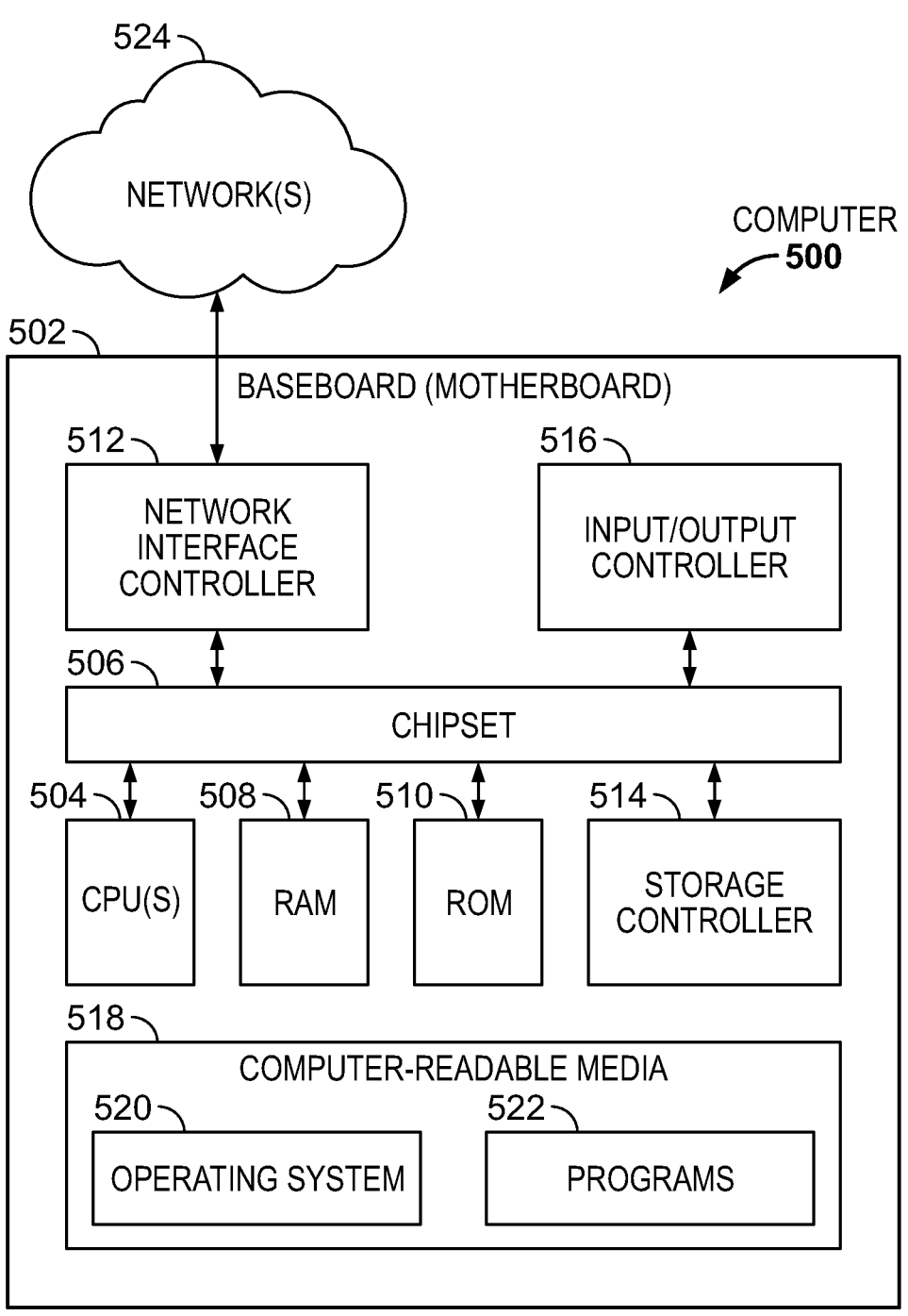
FIG. 5 illustrates a computer architecture diagram showing an illustrative computer hardware architecture for implementing a computing device that can be utilized to implement aspects of the various technologies presented herein.

FIG. 5 shows an example of computer architecture for a computer 500 capable of executing program components for implementing the functionality described herein including the functionality of the network management system. The computer architecture shown in FIG. 5 illustrates a conventional server computer, workstation, desktop computer, laptop, tablet, network appliance, e-reader, smartphone, or other computing device, and can be utilized to execute any of the software components presented herein. The computer 500 may, in some examples, correspond to any of the servers, routers, or devices discussed herein. In some embodiments, computer 500) may include networked devices such as servers, switches, routers, hubs, bridges, gateways, modems, repeaters, access points, etc. Additionally, in some implementations, the programs or software discussed herein may be configured to perform operations performed by any of the devices. In some instances, the computer may correspond to any device described herein and be configured to perform operations performed by any device, and/or maybe a system of devices that perform the techniques described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 506 provides an interface between the CPU 504 and the remainder of the components and devices on the baseboard 502. The chipset 506 can provide an interface to a RAM 508, used as the main memory in the computer 500. The chipset 506 can further provide an interface to a computer-readable storage medium such as read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as Network 524. The chipset 506 can include functionality for providing network connectivity through a Network Interface Controller (NIC) 512, such as a gigabit Ethernet adapter. The NIC 512 is capable of connecting the computer 500 to other computing devices over network 524. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other types of interfaces for physically connecting and transferring data between computers and physical storage units.

The computer 500 can store data on the storage device 518 by transforming the physical state of the physical storage units to reflect the information being stored. The specific transformation of the physical state can depend on various factors, in different embodiments of this description. Examples of such factors can include but are not limited to, the technology used to implement the physical storage units, whether the storage device 518 is characterized as primary or secondary storage, and the like.

For example, computer 500 can store information the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by devices described herein, and or any components included therein, may be supported by one or more devices similar to computer 500. Stated otherwise, some or all of the operations performed by the network management system 205, the DNAC controller 25, the wireless controller 30, the edge node 20, the map server 37, the control plane 30, and the access point 40 and/or any components included therein, may be performed by one or more computer devices 500 operating in a system.

By way of example, and not limitation, computer-readable storage media can include volatile and non-volatile, removable, and non-removable media implemented in any method or technology. Computer-readable storage media includes but is not limited to, RAM, ROM, erasable programmable ROM ("EPROM"), electrically-erasable programmable ROM ("EEPROM"), flash memory, or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPU 504 transitions between states, as described above. According to one embodiment, the computer 500 has access to computer-readable storage media storing computer-executable instructions which, when executed by the computer 500, perform the various processes described herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other types of input devices. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500) may comprise one or more a router, a border router, an edge node, a wireless controller, a control plane, and/or a server. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

Clause 1. A method of configuring a network management system, comprising: operably coupling a network to a control plane that communicates with a wireless controller; in response to a client attempting to access an endpoint of the network, generating by the network management system, a first message that at least comprises a failure to access the endpoint based on an edge node of the network being unable to allocate an endpoint identifier (EID) of the endpoint to the client; in response to the first message of the failure of the client to access the endpoint generating, by the network management system, a second message to send to a map server of the network to provide information about an access failure on a part of the client wherein the information of the second message at least comprises notification of a resource exhaustion to allocate the EID of the endpoint to the client by the network; and determining, by the network management system, whether the wireless controller is aware via the control plane of the client attempting access to the network or of the resource exhaustion based on the information sent to the map server by the network management system by checking whether at least an IP address associated with the client corresponds to a registration produced for the client by the wireless controller.

Clause 2. The method of clause 1, further comprising: in response to a determination that the wireless controller has produced the registration for the client, relaying by the network management system, at least the notification of the resource exhaustion to the wireless controller.

Clause 3. The method of clause 1, wherein the network management system is configured in a reactive mode to respond to the failure of the client to access an endpoint of the network.

Clause 4. The method of clause 1, further comprising: generating, by the network management system, the notification of a watermark level of at least one of an ability of the network to allocate a resource or a resource exhaustion of client access to the endpoint based on the information sent to the map server in the second message.

Clause 5. The method of clause 4, wherein the watermark level at least comprises one of a high watermark level or a low watermark level.

Clause 6. The method of clause 1, wherein the information about the access failure comprises the IP address of the network associated with the client with a MAC address associated with the client.

Clause 7. The method of clause 5, wherein the registration comprises a MAC registration of the client.

Clause 8. The method of clause 1, wherein in response to the information sent to the map server by the network management system and provided to the control plane in communication with the wireless controller, the network management system enabling the wireless controller to cause at least one of an action of generating a Syslog message associated with the failure of the client to access the network, de-authenticating the client from the network, or releasing the IP address of the network associated with the client.

Clause 9. A method of configuring a network management system, comprising: operably coupling a network to a control plane that communicates with a wireless controller; registering, by the network management system via an edge node of the network, an access point as a wired endpoint to a map server of the network wherein the registering comprises information of a type of the wired endpoint associated with one or more constraints to the map server via an opaque object; in response to a request to the map server for a locater of the access point from the wireless controller, sending by the network management system to the wireless controller, a point of attachment for the access point with opaque data from the opaque object; and in response to the opaque data sent to the wireless controller, enabling, by the network management system, the wireless controller to maintain a count of a number of client IP addresses with clients of the wireless controller to available points of attachment at the network.

Clause 10. The method of clause 9, further comprising: enabling, by the network management system, the wireless controller to determine based on a count maintained by the wireless controller of the number of client IP addresses whether to allow access or not to allow access to one or more clients to the network.

Clause 11. The method of clause 9, wherein the network management system is configured in a proactive mode to determine whether or not to allow access to one or more clients by the wireless controller to the network based on at least opaque data provided to the wireless controller by the network management system.

Clause 12. The method of clause 9 wherein the one or more constraints to the map server is dependent on platform type enabled for registering the access point as a wired client to the map server.

Clause 13. The method of clause 9, wherein the network management system indicates a type of constraint and a potential constraint to the map server in an opaque object.

Clause 14. The method of clause 9 wherein the wireless controller is configured to maintain the count of clients and IP addresses associated with a client.

Clause 15. The method of clause 11, wherein the proactive mode further comprising: operably coupling a network controller to the network management system; and receiving, by the network management system, one or more constraints associated with resource limits published by the network controller for configuring the network with the control plane.

Clause 16. A system comprising: one or more processors; and one or more non-transitory computer-readable media storing computer-executable instructions that, when executed by the one or more processors, cause the one or more processors to perform operations comprising: configuring a network in first mode comprising a reactive mode to respond to a client attempting to access an endpoint of the network by providing information to be sent to a map server and by checking whether at least an IP address associated with the client corresponds to a registration produced for the client by a wireless controller; and configuring the network in a second mode comprising a proactive mode to determine based on a count maintained by a wireless controller of a number of client IP addresses whether to allow access or not to allow access to one or more clients to the network.

Clause 17. The system of clause 16, in the reactive mode, the operations further comprising: operably coupling the network to a control plane that communicates with the wireless controller; in response to a client attempting to access an endpoint of the network, generating a first message that at least comprises a failure to access the endpoint based on an edge node of the network being unable to allocate an endpoint identifier (EID) of the endpoint to the client; in response to the first message of the failure of the client to access the endpoint generating a second message to send to a map server of the network to provide information about an access failure on a part of the client wherein the information of the second message at least comprises notification of a resource exhaustion to allocate the EID of the endpoint to the client by the network; and determining whether the client is aware via the control plane of at least of the resource exhaustion provided by the information sent to the map server by checking whether at least an IP address associated with the client corresponds to a registration produced for the client by the wireless controller.

Clause 18. The system of clause 17, in the reactive mode, the operations further comprising: in response to a determination that the wireless controller has produced the registration for the client, relaying at least the notification of the resource exhaustion to the wireless controller.

Clause 19. The system of clause 16, in the proactive mode, the operations further comprising: operably coupling a network to a control plane that communicates with a wireless controller; registering via an edge node of the network, an access point as a wired endpoint to a map server of the network wherein the registering comprises information of a type of the wired endpoint associated with one or more constraints to the map server via an opaque object; in response to a request to the map server for a locater of the access point from the wireless controller, sending to the wireless controller, a point of attachment for the access point with opaque data from the opaque object; and in response to the opaque data sent to the wireless controller, enabling the wireless controller to maintain a count of a number of client IP addresses with clients of the wireless controller to available points of attachment at the network.

Clause 20. The system of clause 16, in the proactive mode, the operations further comprising: determining whether or not to allow access to one or more clients by the wireless controller to the network based on at least opaque data provided to the wireless controller.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of configuring a network management system, comprising:
   operably coupling a network to a control plane that communicates with a wireless controller;
   registering, by the network management system via an edge node of the network, an access point as a wired endpoint to a map server of the network wherein the registering comprises information of a type of the wired endpoint associated with one or more constraints to the map server via an opaque object;
   in response to a request to the map server for a locater of the access point from the wireless controller, sending by the network management system to the wireless controller, a point of attachment for the access point with opaque data from the opaque object; and
   in response to the opaque data sent to the wireless controller, enabling, by the network management system, the wireless controller to maintain a count of a number of client IP addresses associated with clients of the wireless controller to available points of attachment at the network.

2. The method of claim 1, further comprising:

enabling, by the network management system, the wireless controller to determine based on a count maintained by the wireless controller of the number of client IP addresses whether to allow access or not to allow access to one or more clients to the network.

3. The method of claim 1, wherein the network management system is configured in a proactive mode to determine whether or not to allow access to one or more clients by the wireless controller to the network based on at least opaque data provided to the wireless controller by the network management system.

4. The method of claim 1 wherein the one or more constraints to the map server is dependent on platform type enabled for registering the access point as a wired client to the map server.

5. The method of claim 1, wherein the network management system indicates a type of constraint and a potential constraint to the map server in an opaque object.

6. The method of claim 1 wherein the wireless controller is configured to maintain the count of the client IP addresses associated with the clients.

7. The method of claim 3, wherein the proactive mode further comprising:

operably coupling a network controller to the network management system; and receiving, by the network management system, one or more constraints associated with resource limits published by the network controller for configuring the network with the control plane.

8. A system comprising:

one or more processors; and one or more non-transitory computer-readable media storing computer-executable instructions that, when executed by the one or more processors, cause the one or more processors to perform operations comprising:

configuring a network in first mode comprising a reactive mode to respond to a client attempting to access an endpoint of the network by providing information to be sent to a map server and by checking whether at least an IP address associated with the client corresponds to a registration produced for the client by a wireless controller; and configuring the network in a second mode comprising a proactive mode to determine, based on a count maintained by the wireless controller of a number of client IP addresses, whether to allow access or not to allow access to one or more clients to the network.

9. The system of claim 8, in the reactive mode, the operations further comprising:

operably coupling the network to a control plane that communicates with the wireless controller;

in response to a client attempting to access an endpoint of the network, generating a first message that at least comprises a failure to access the endpoint based on an edge node of the network being unable to allocate an endpoint identifier (EID) of the endpoint to the client;

in response to the first message of the failure of the client to access the endpoint generating a second message to send to a map server of the network to provide information about an access failure on a part of the client wherein the information of the second message at least comprises notification of a resource exhaustion to allocate the EID of the endpoint to the client by the network; and determining whether the client is aware via the control plane of at least of the resource exhaustion provided by the information sent to the map server by checking whether at least an IP address associated with the client corresponds to a registration produced for the client by the wireless controller.

10. The system of claim 9, in the reactive mode, the operations further comprising:

in response to a determination that the wireless controller has produced the registration for the client, relaying at least the notification of the resource exhaustion to the wireless controller.

11. The system of claim 8, in the proactive mode, the operations further comprising:

operably coupling a network to a control plane that communicates with a wireless controller;

registering via an edge node of the network, an access point as a wired endpoint to a map server of the network wherein the registering comprises information of a type of the wired endpoint associated with one or more constraints to the map server via an opaque object;

in response to a request to the map server for a locater of the access point from the wireless controller, sending to the wireless controller, a point of attachment for the access point with opaque data from the opaque object; and in response to the opaque data sent to the wireless controller, enabling the wireless controller to maintain a count of a number of client IP addresses with clients of the wireless controller to available points of attachment at the network.

12. The system of claim 8, in the proactive mode, the operations further comprising:

determining whether or not to allow access to one or more clients by the wireless controller to the network based on at least opaque data provided to the wireless controller.

13. A method of configuring a network management system, comprising:

operably coupling a network to a control plane that communicates with a wireless controller;

registering, by the network management system using an edge node of the network, an access point as a wired endpoint to a map server of the network;

registering, by the network management system, information using an opaque object, at the access point of a type of the wired endpoint associated with one or more constraints to the map server;

sending by the network management system to the wireless controller, a point of attachment for the access point by opaque data from the opaque object; and maintaining, by the wireless controller, a count of a number of client IP addresses with clients to available points of attachment to the network for enabling an allocating of access points to the map server.

14. The method of claim 13, further comprising:

determining, by the wireless controller, based on the count being maintained of the number of client IP addresses whether to allow at least access to a client to the network.

15. The method of claim 13, wherein the one or more constraints to the map server is dependent on platform type enabled for registering the access point as a wired client to the map server.

16. The method of claim 13, further comprising:

providing, by the network management system, the opaque data in the opaque object comprising information of at least a type of constraint and a potential constraint to the map server.

17. The method of claim 13, further comprising:

maintaining, by the wireless controller, a count of clients and IP addresses associated with a client.

18. The method of claim 13, further comprising:

configuring the network in a first mode that comprises a reactive mode for responding to a client attempting to access an endpoint of the network by providing information to be sent to the map server and by checking whether at least an IP address associated with the client corresponds to a registration produced for the client; and configuring the network in a second mode that comprises a proactive mode for determining based on the count maintained of client IP addresses whether to at least allow access to one or more clients to the network.

19. The method of claim 18, wherein the proactive mode further comprises:

operably coupling a network controller to the network management system; and receiving, by the network management system, one or more constraints associated with resource limits published by the network controller for configuring the network with the control plane.

20. The method of claim 13, further comprising:

in response to information sent from the map server and being provided to the control plane in communication with the wireless controller, performing, by the wireless controller, a plurality of actions comprising at least one of generating a Syslog message associated with a failure of the client accessing the network, de-authenticating the client from the network, or releasing an IP address of the network associated with the client.

* * * * *